United States Patent
Foi et al.

(10) Patent No.: US 12,228,677 B2
(45) Date of Patent: Feb. 18, 2025

(54) RADAR DATA DENOISING SYSTEMS AND METHODS

(71) Applicants: Teledyne FLIR Commercial Systems, Inc., Goleta, CA (US); Noiseless Imaging Oy Ltd., Tampere (FI)

(72) Inventors: Alessandro Foi, Tampere (FI); Lucio Azzari, Tampere (FI)

(73) Assignees: TELEDYNE FLIR COMMERCIAL SYSTEMS, INC., Goleta, CA (US); NOISELESS IMAGING OY LTD., Tampere (FI)

( * ) Notice: Subject to any disclaimer, the term of this patent is extended or adjusted under 35 U.S.C. 154(b) by 235 days.

(21) Appl. No.: 17/777,000

(22) PCT Filed: Nov. 25, 2020

(86) PCT No.: PCT/US2020/062442
§ 371 (c)(1),
(2) Date: May 13, 2022

(87) PCT Pub. No.: WO2021/108729
PCT Pub. Date: Jun. 3, 2021

(65) Prior Publication Data
US 2022/0413092 A1    Dec. 29, 2022

Related U.S. Application Data

(60) Provisional application No. 62/941,595, filed on Nov. 27, 2019.

(51) Int. Cl.
*G01S 7/28* (2006.01)
*G01S 13/34* (2006.01)

(52) U.S. Cl.
CPC .......... *G01S 7/2813* (2013.01); *G01S 13/346* (2013.01)

(58) Field of Classification Search
CPC .................. G01S 7/2813; G01S 13/346
See application file for complete search history.

(56) References Cited

U.S. PATENT DOCUMENTS

| 5,781,144 A * | 7/1998 | Hwa ............... G01S 7/021 342/197 |
| 2004/0178951 A1* | 9/2004 | Ponsford ............. G01S 7/32 342/194 |

(Continued)

OTHER PUBLICATIONS

A. Foi, "Noise estimation and removal in MR imaging: The variance-stabilization approach," 2011 IEEE International Symposium on Biomedical Imaging: From Nano to Macro, Chicago, IL, USA, 2011, pp. 1809-1814, doi: 10.1109/ISBI.2011.5872758. (Year: 2011).*

(Continued)

*Primary Examiner* — Vladimir Magloire
*Assistant Examiner* — Noah Yi Min Zhu
(74) *Attorney, Agent, or Firm* — Haynes and Boone, LLP

(57) ABSTRACT

Techniques are disclosed for radar data denoising systems and methods. In one example, a method includes receiving radar data. The method further includes performing a first transform associated with the radar data to obtain transformed radar data. The transformed radar data is associated with a location parameter and a variance that is independent of the location parameter. The method further includes performing a second transform of the transformed radar data to obtain dimensionality-reduced radar data. The method further includes filtering the dimensionality-reduced radar data to obtain denoised dimensionality-reduced radar data. Related devices and systems are also provided.

20 Claims, 7 Drawing Sheets

(56) References Cited

U.S. PATENT DOCUMENTS

2018/0011180 A1* 1/2018 Warnick .................. G01S 13/06
2018/0085089 A1* 3/2018 Chang .................. A61B 8/0883

OTHER PUBLICATIONS

T. Liu, F. Wen, L. Zhang and K. Wang, "Off-Grid DOA Estimation for Colocated MIMO Radar via Reduced-Complexity Sparse Bayesian Learning," in IEEE Access, vol. 7, pp. 99907-99916, 2019, doi: 10.1109/ACCESS.2019.2930531. (Year: 2019).*

M. Makitalo, A. Foi, D. Fevralev and V. Lukin, "Denoising of single-look SAR images based on variance stabilization and nonlocal filters," 2010 International Conference on Mathematical Methods in Electromagnetic Theory, Kyiv, Ukraine, 2010, pp. 1-4, doi: 10.1109/MMET.2010.5611418. (Year: 2010).*

Liu Tingting, et al., "Off-Grid DOA Estimation for Colocated MIMO Radar via Reduced-Complexity Sparse Bayesian Learning", IEEE Access, Jul. 23, 2019, pp. 99907-99916.

* cited by examiner

RADAR DATA DENOISING SYSTEMS AND METHODS

CROSS-REFERENCE TO RELATED APPLICATIONS

This patent application is a U.S. National Stage Patent Application under 35 U.S.C. 371 of International Patent Application No. PCT/US2020/062442 filed Nov. 25, 2020 and entitled "Radar Data Denoising Systems And Methods," which claims priority to U.S. Provisional Patent Application No. 62/941,595 filed Nov. 27, 2019 and entitled "Radar Data Denoising Systems And Methods." each of which is incorporated herein by reference in its entirety.

TECHNICAL FIELD

One or more embodiments relate generally to radar processing and more to particularly, for example, to radar data denoising systems and methods.

BACKGROUND

Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

In one or more embodiments, a method includes receiving radar data. The method further includes performing a first transform associated with the radar data to obtain transformed radar data. The transformed radar data is associated with a location parameter and a variance that is independent of the location parameter. The method further includes performing a second transform of the transformed radar data to obtain dimensionality-reduced radar data. The method further includes filtering the dimensionality-reduced radar data to obtain denoised dimensionality-reduced radar data.

In one or more embodiments, a system includes a receiver configured to receive radar data. The system further includes a processor coupled to the receiver. The system further includes a non-transitory machine-readable medium comprising instructions stored therein, which when executed by the processor, cause the processor to perform operations. The operations include performing a first transform associated with the radar data to obtain transformed radar data. The transformed radar data is associated with a location parameter and a variance that is independent of the location parameter. The operations further include performing a second transform of the transformed radar data to obtain dimensionality-reduced radar data. The operations further include filtering the dimensionality-reduced radar data to obtain denoised dimensionality-reduced radar data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
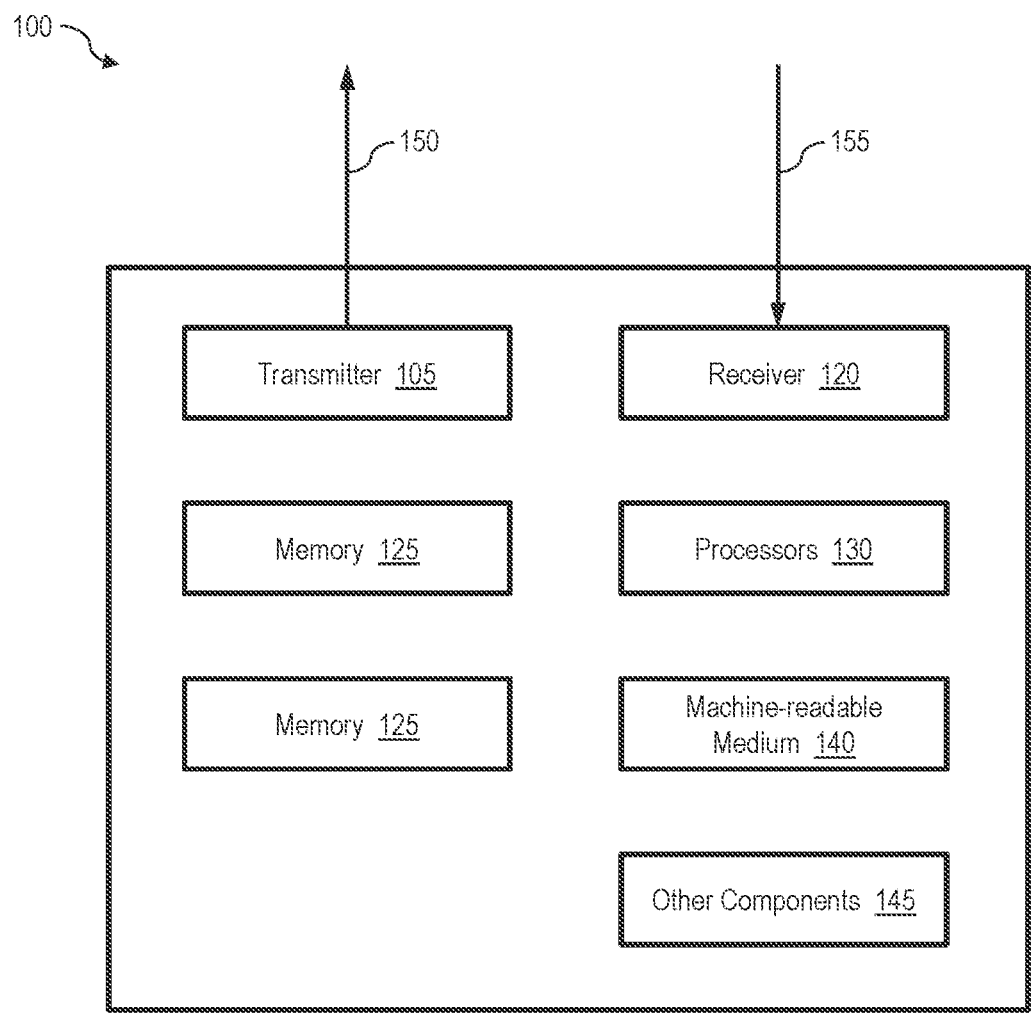
FIG. 1 illustrates a block diagram of a radar system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are disclosed for radar data denoising. In some embodiments, a receiver for a radar system receives electromagnetic (EM) signals associated with a scene. The received EM signals are typically reflections of transmitted signals that impinge upon objects in the scene. Such received EM signals may be referred to as radar return signals, radar return data, or simply radar data. The transmitted signals may be pulse signals, ramp signals (e.g., in the case of frequency modulated continuous waveform (FMCW) signals), or other types of signals dependent on application. A pipeline provided in accordance with one or more embodiments may be used to process the radar data to denoise the radar data to obtain an estimate/expectation of the radar data absent corruption from noise. To facilitate denoising, the pipeline may include various data transformations, such as variance-stabilizing transformations and dimensionality-reduction transformations. In some cases, noise in the radar data may be modeled by a Rician distribution (e.g., also referred to as a Rice distribution). By using the pipeline according to various embodiments, noise/clutter from radar signals may be removed to improve a signal-to-noise ratio (SNR) and allow for detection and tracking of objects of interests at longer distances and with lower radar signal amplitude.

In an aspect, the received EM signals may be converted by the radar system into baseband data (e.g., complex-valued baseband data) that may be arranged in a three-dimensional array of size N-by-M-by-L (e.g., also denoted as N×M×L). The three-dimensional array may be referred to as a radar data cube, a radar measurements matrix, or simply a measurements matrix. N may be associated with range bins (e.g., also referred to as range cells or range indices) and referred to as a fast-time dimension. M may be associated with transmitted signals (e.g., pulses or ramps) and referred to as a slow-time dimension. L may be associated with sensors (e.g., receiver antennas) and referred to as a spatial dimension.

Referring now to the drawings, FIG. 1 illustrates a block diagram of a radar system 100 in accordance with one or more embodiments of the present disclosure. Variations in the arrangement and type of the components may be made without departing from the spirit or scope of the claims as set forth herein. Additional components, different components, and/or fewer components may be provided. In various embodiments, the radar system 100 may be configured for use on watercraft, aircraft, vehicles, fixed locations, or other environments, and may be used for various applications such as, for example, leisure navigation, commercial navigation, military navigation, other types of navigation, or other applications. In one aspect, the radar system 100 may be implemented as a relatively compact portable unit to that may be conveniently installed by a user. For example, the radar system 100 may be installed in a mobile device.

The radar system 100 includes a transmitter circuitry 105, a receiver circuitry 120, a memory 125, processors 130, a display 135, a machine-readable medium 140, and other components 145. The transmitter circuitry 105 includes one or more transmit (TX) antenna elements and appropriate circuitry to generate radar signals and provide such radar signals to the TX antenna elements, such that these radar signals can be transmitted by the TX antenna elements. Such transmitted radar signals are denoted as signals 150 of FIG. 1. The transmitter circuitry 105 may include a waveform generator that generates various waveforms to be utilized as radar signals. Such waveforms may include pulses of various lengths (e.g., different pulse widths), FMCW signals, and/or other waveforms appropriate for radar applications. FMCW signals may be implemented, for example, as rising, falling, or rising/falling frequency sweeps (e.g., upchirps, downchirps, or up/down chirps). The transmitter circuitry 105 may include one or more power amplifiers that receive the radar signals from the waveform generator and drive the radar signals on the TX antenna element(s) of the transmitter circuitry 105. In some cases, characteristics of the radar signals may be based at least in part from control signals received by the processors 130.

The receiver circuitry 120 may include one or more sensors and circuitry to process radar signals received by the sensors. The sensors may be receive (RX) antenna elements (e.g., phased array antennas). Such received radar signals are denoted as signals 155 of FIG. 1. The sensors can receive the radar signals 155, which may be reflections of the transmitted radar signals 150 from targets/objects. These received radar signals 155 may be referred to as return signals. The receiver circuitry 120 may include appropriate circuitry to process these return signals. The receiver circuitry 120 may include one or more low-noise amplifiers (LNAs) for amplifying the received radar signals 155. The receiver circuitry 120 may include a demodulator to receive the radar signals 155 and convert the received radar signals 155 to baseband. In some cases, the demodulator may generate I signals and Q signals based on the received radar signals 155. The receiver circuitry 120 may include filters (e.g., low-pass filters) to be applied to the radar signals (e.g., baseband radar signals). The receiver circuitry 120 may include an analog-to-digital (ADC) circuit to convert the received radar signals 155, or filtered versions thereof, which are analog signals, to digital radar signals. The digital radar signals may be provided to the processors 130 for further processing to facilitate radar applications (e.g., target detection applications). The radar system 100 may be implemented with one or more amplifiers, modulators (e.g., downconverters, upconverters), phase adjusters, beamforming components, digital-to-analog converters (DACs), ADCs, various interfaces, transducers, and/or other analog and/or digital components.

The processors 130 may be implemented as any appropriate processing device (e.g., microcontroller, processor, application specific integrated circuit (ASIC), logic device, field-programmable gate array (FPGA), circuit, or other device) that may be used by the radar system 100 to execute appropriate instructions, such as non-transitory machine readable instructions (e.g., software) stored on the machine-readable medium 140 and loaded into the memory 125. For example, on an RX side, the processors 130 may be configured to receive and process radar data received by the receiver circuitry 120, store the radar data, processed radar data, and/or other data associated with the radar data in the memory 125, and provide the radar data, processed radar data, and/or other data associated with the radar data for processing, storage, and/or display. In this example, outputs of the processors 130 may be, or may be derived into, representations of processed radar data that can be displayed by the display 135 for presentation to one or more users. On a TX side, the processors 130 may generate radar signals or associated signals to cause radar signals to be generated and fed to the transmitter circuitry 105, such that these radar signals can be transmitted by the TX antenna element(s) of the transmitter circuitry 105. In an embodiment, the processors 130 may be utilized to process radar return data (e.g., perform transforms such as Fast Fourier Transforms (FFT) and discrete cosine transforms, perform detection processing on FFT outputs) received via the receiver circuitry 120, generate target data, perform mitigation actions or cause performing of mitigation actions if appropriate in response to the target data, and/or other operations.

The memory 125 includes, in one embodiment, one or more memory devices configured to store data and information, including radar data. The memory 125 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processors 130 may be configured to execute software instructions stored in the memory 125 so as to to perform method and process steps and/or operations. The processors 130 may be configured to store in the memory 125 data such as, by way of non-limiting examples, filter coefficients, beamforming coefficients, and object/target detection data.

The display 135 may be used to present radar data, images, or information received or processed by the radar system 100. In one embodiment, the display 135 may be a multifunction display with a touchscreen configured to receive user inputs to control the radar system 100.

The radar system 100 may include various other components 145 that may be used to implement other features such as, for example, sensors, actuators, communications modules/nodes, other user controls, communication with other devices, additional and/or other user interface devices, and/or other components. In some embodiments, other components 145 may include a humidity sensor, a wind and/or water temperature sensor, a barometer, a visible spectrum camera, an infrared camera, and/or other sensors providing measurements and/or other sensor signals that can be displayed to a user and/or used by other devices of radar system 100 to provide operational control of the radar system 100. For example, such sensor signals may be utilized to compensate for environmental conditions, such as wind speed and/or direction; swell speed, amplitude, and/or direction; and/or an object in a path (e.g., line of sight) of the radar system 100. Imagers (e.g., visible spectrum camera, infrared camera) may be utilized to provide situational awareness of a scene, such as by providing image data associated with captured radar data. In some cases, sensor information can be used to correct for movement (e.g., changes in position and/or speed) associated with the radar system 100 between beam emissions to provide improved alignment of corresponding radar returns/samples, for example, and/or to generate imagery based on the measured orientations and/or positions of the radar system 100 assembly/antennas. In some cases, an external orientation and/or position sensor can be used alone or in combination with an integrated sensor or sensors. In some cases, alternatively or in addition to having sensors and/or other devices as part of the radar system 100, the sensors and/or other devices may be collocated with the radar system 100. Such sensors and/or other devices may provide data to the radar system 100 (e.g., via wired and/or wireless communication).

In some cases, the radar system 100 may include one or more visible spectrum cameras and/or one or more infrared cameras, such as to capture image data of a scene scanned by the radar system 100. In one embodiment, the other components 145 includes a communication interface that may communicate with another device that may be implemented with some or all of the features of the radar system 100. Such communication may be performed through appropriate wired or wireless signals (e.g., Wi-Fi™, Bluetooth™, or other standardized or proprietary wireless communication techniques). In one example, the radar system 100 may be located at a first position (e.g., on a bridge of a watercraft in one embodiment) and may communicate with a personal electronic device (e.g., a cell phone in one embodiment) located at a second position (e.g., co-located with a user on another location on the watercraft). In this regard, the user's personal electronic device may receive radar data and/or other information from the radar system 100. As a result, a user may conveniently receive relevant information (e.g., radar images, alerts, or other information) even while not in proximity to the radar system 100.

In one or more embodiments, techniques are provided herein to facilitate denoising of radar data. In some aspects, such radar data may be corrupted by noise that can be accurately modeled as heteroskedastic complex Gaussian noise (e.g., complex Gaussian noise having a non-uniform variance) over sensors in a detector array (e.g., the receiver circuitry 120). For example, the detector array may be an antenna array that includes multiple antenna elements. Such heteroskedasticity may include/characterize non-uniformity of noise variance from sensor to sensor and with respect to a range component. In some cases, the noise samples are correlated with respect to range and Doppler components. Based on such noise modeling and characterization, a pipeline for filtering the noise from beamformed amplitude data is provided. The pipeline may have a multichannel implementation of a BM3D filter operated in a frame-by-frame manner. In some aspects, an output of the filter preserves fine structures while providing near-total attenuation of the noise.

In some embodiments, when a transmitted signal is reflected by an object in a scene (e.g., a potential target present in the scene) and is received by a radar system, the radar system's receiver passband bandwidth may determine how much of the received signal energy is captured by the radar system. A measurements matrix (e.g., also referred to as a radar data matrix) for a single detection beam (e.g., a single sensor) may be provided as follows:

$$\begin{bmatrix} rc_{0,0} & \cdots & rc_{0,j} & \cdots & rc_{0,M-1} \\ \vdots & \ddots & \vdots & \ddots & \vdots \\ rc_{i,0} & \cdots & rc_{i,j} & \cdots & rc_{i,M-1} \\ \vdots & \ddots & \vdots & \ddots & \vdots \\ rc_{N-1,0} & \cdots & rc_{N-1,j} & \cdots & rc_{N-1,M-1} \end{bmatrix} \quad (1)$$

The measurements matrix has a size of N rows and M columns, where each row is associated with a range index (e.g., fast-time axis) and each column is associated with a ramp (e.g., slow-time axis). Each row of the matrix (1) represents a series of measurements from the same range bin over M successive ramps. Range cell values $rc_{i,j}$ of the measurements matrix may be the sampled signal energy captured by a receiver of the radar system for a single spatial dimension (e.g., a single sensor). In the measurements matrix above, the range cell values $rc_{i,j}$ are provided for a range index i=[0, N−1] and ramp index j=[0, M−1], such that the measurements matrix provides the sampled signal for each range index (e.g., $0^{th}$ range index to $(N-1)^{th}$ range index) and each ramp (e.g., $0^{th}$ ramp to $(M-1)^{th}$ ramp). For example, a range cell value $rc_{0,0}$ is the sampled signal energy for a zeroth range index and a first ramp (e.g., ramp 0). In an aspect, a range cell value $rc_{i,j}$ may be a result obtained from sampling the radar return data received by the radar system's receiver and applying a window to the sampled data. In the case of multiple sensors, the measurements matrix may be of size N×M×L, where L is the number of sensors. In this regard, in the above example, L=1.

For explanatory purposes only, the detector array includes four sensors and the radar data is associated with 64 ramps and 512 range bins. More generally, the detector array may have fewer or more than four sensors and/or the radar data may be associated with more or fewer than 64 ramps and/or more or fewer than 512 range bins. For each temporal instance in the above-example, a frame of the data is a complex-valued 512×64×4 array (e.g., N=512, M=64, L=4), where the three dimensions of the array respectively represent the range, Doppler (e.g., speed), and sensor/array components. In an aspect, the radar data may be represented as a radar data cube. In the radar data cube, a slow time axis provides a number of ramps (e.g., 64 ramps in this example), a fast time axis provides a number of range bins for a given pulse and represents a range delay (e.g., 512 range bins in this example), and a spatial axis provides a number of sensors (e.g., 4 in this example). In one aspect, the four sensors may be used for beamforming. In one example, the beamforming yields an angular resolution of 181 angles per π, of which only an amplitude component is retained for tracking. In this example, an input to the tracking is a real-valued non-negative 512×64×181 array. Each of the 181 angles may be referred to as a channel.

Figure 2:
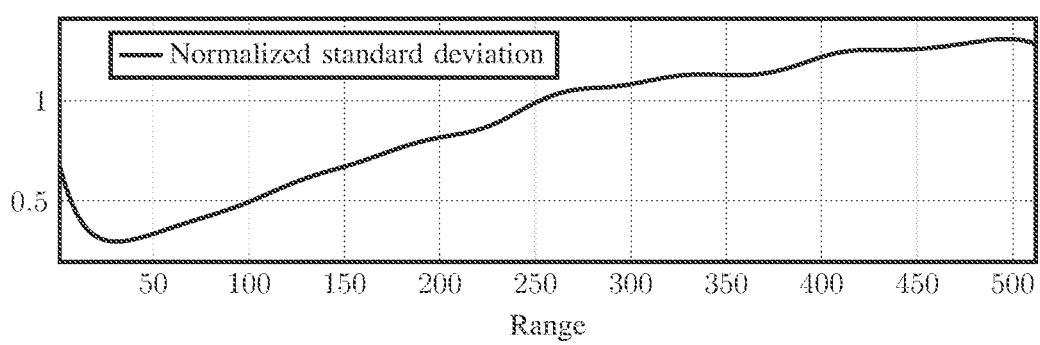
FIG. 2 illustrates a standard deviation as a function of a range.
Figure 3:
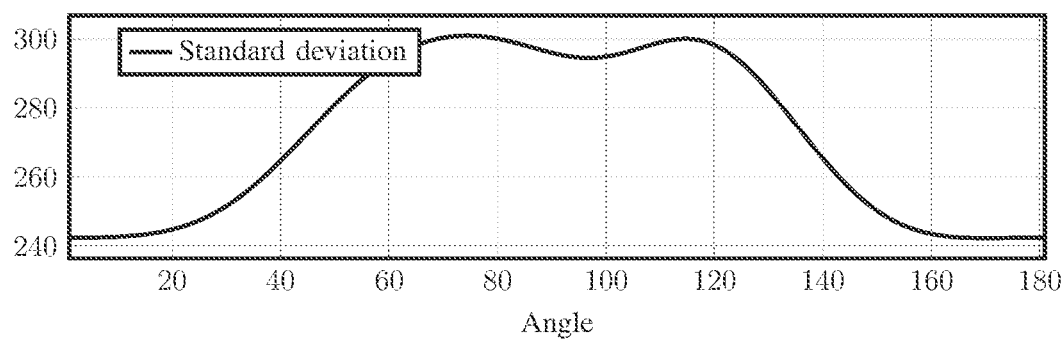
FIG. 3 illustrates a standard deviation as a function of an angle.

In one case, techniques provided herein are facilitated through an analysis of the noise characteristics of the complex-valued 512×64×4 array as input and in the modeling of the noise propagation through the beamforming process. Data from each sensor of the array may be modeled as a complex variable with an unknown mean and a known variance. In an aspect, the variance may depend on the range and on the specific array, but not on the Doppler or temporal components, as provided by Table I and FIG. 2. FIG. 2 illustrates a noise standard deviation as a function of the range. The standard deviation is normalized by its value at a range of around 250. Decoupling and beamforming may operate on the four array components. The variance as a function of the angular component can be calculated from the variance of the four array inputs, resulting in a standard-deviation profile shown in FIG. 3. FIG. 3 illustrates a noise standard deviation as a function of the 181 angles.

TABLE I

| | Standard deviation of four channels | | | |
|---|---|---|---|---|
| | Ch1 | Ch2 | Ch3 | Ch4 |
| st. dev. | 516.57 | 541.11 | 576.66 | 522.29 |

Figure 4:
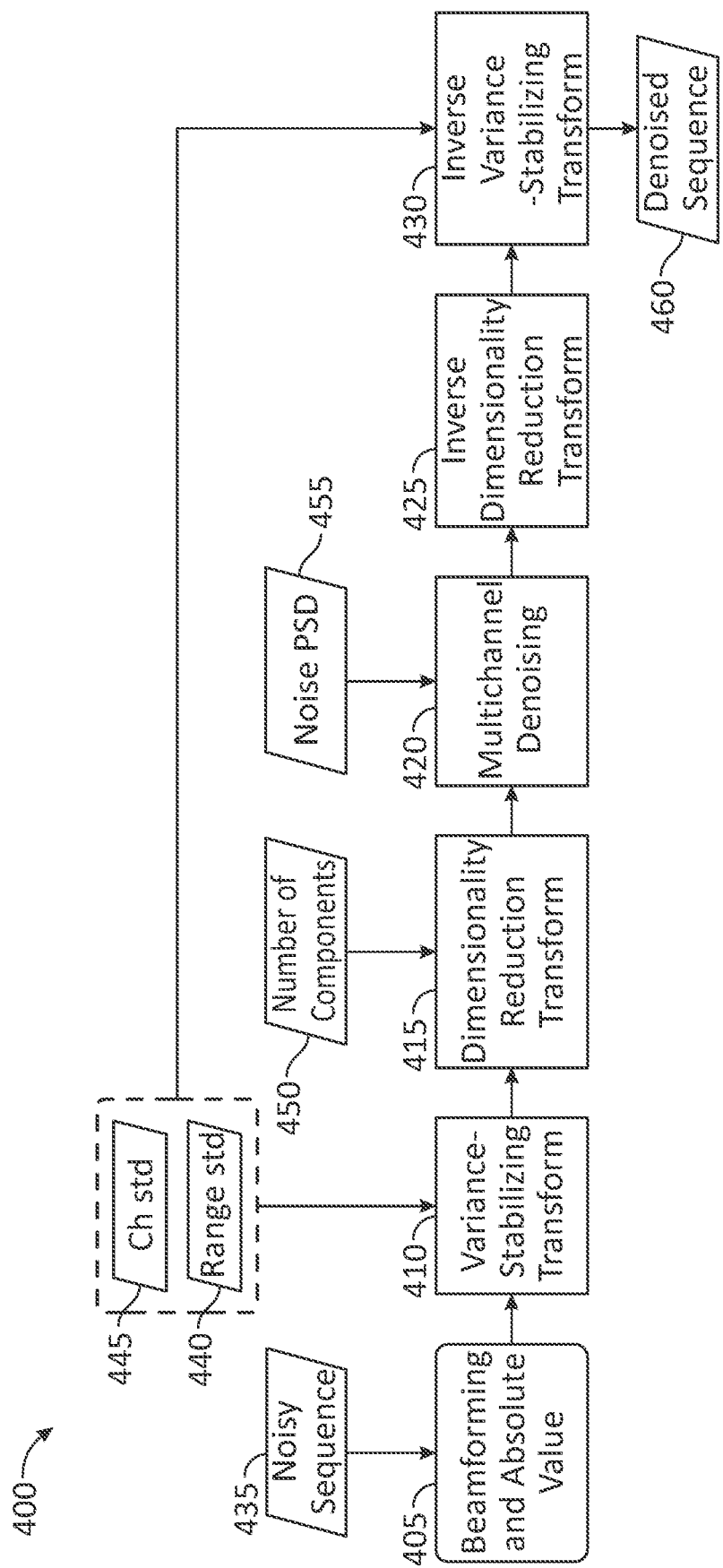
FIG. 4 illustrates a flowchart of an example filtering pipeline in accordance with one or more embodiments of the present disclosure.

FIG. 4 illustrates a flowchart of an example filtering pipeline 400 in accordance with one or more embodiments of the present disclosure. In an embodiment, the processors 130 of FIG. 1 may be utilized to perform the example process of FIG. 4. It should be appreciated that the processors 130 and various components thereof are identified only for purposes of example, and that any other suitable system may be utilized to perform all or part of the process 400.

In the process 400, noisy radar data 435 is provided (e.g., as a noisy sequence). In the above-example, the noisy radar data 435 may be provided as a 512×64×4 array. At block 405, the noisy radar data 435 is beamformed and an absolute value (e.g., a magnitude) computed to obtain amplitude data. To perform the beamforming, four beams from the four sensors may be computed for each range cell. In an aspect, the amplitude data may follow a Rician distribution with an unknown location parameter and a known scale parameter. The scale parameter may be given by a tensor product of, for example, a range-wise standard deviation 440 and a channel-wise standard deviation 445 shown in FIGS. 2 and 3. In some cases, an output of block 405 may be referred to as magnitude images. Rician variates may be subject also to signal-dependent variance. In other words, the variance of the amplitude may depend not only on the known scale parameter but also on the unknown location parameter.

At block 410, a variance-stabilizing transformation (VST) is performed on the amplitude data output at block 405 to stabilize the variance of the amplitude data. The variance-stabilizing transformation may be based on the range-wise standard deviation 440 and the channel-wise standard deviation 445, such as those shown in FIGS. 2 and 3. Such processing of the amplitude data may facilitate subsequent filtering operations (e.g., denoising operations). In some cases, the amplitude data may be processed such that the variance of the stabilized signal is unitary and independent of the unknown location parameter. In an aspect, the amplitude data may be stabilized using a VST for Rician data as would be understood by one skilled in the art.

Figure 5:
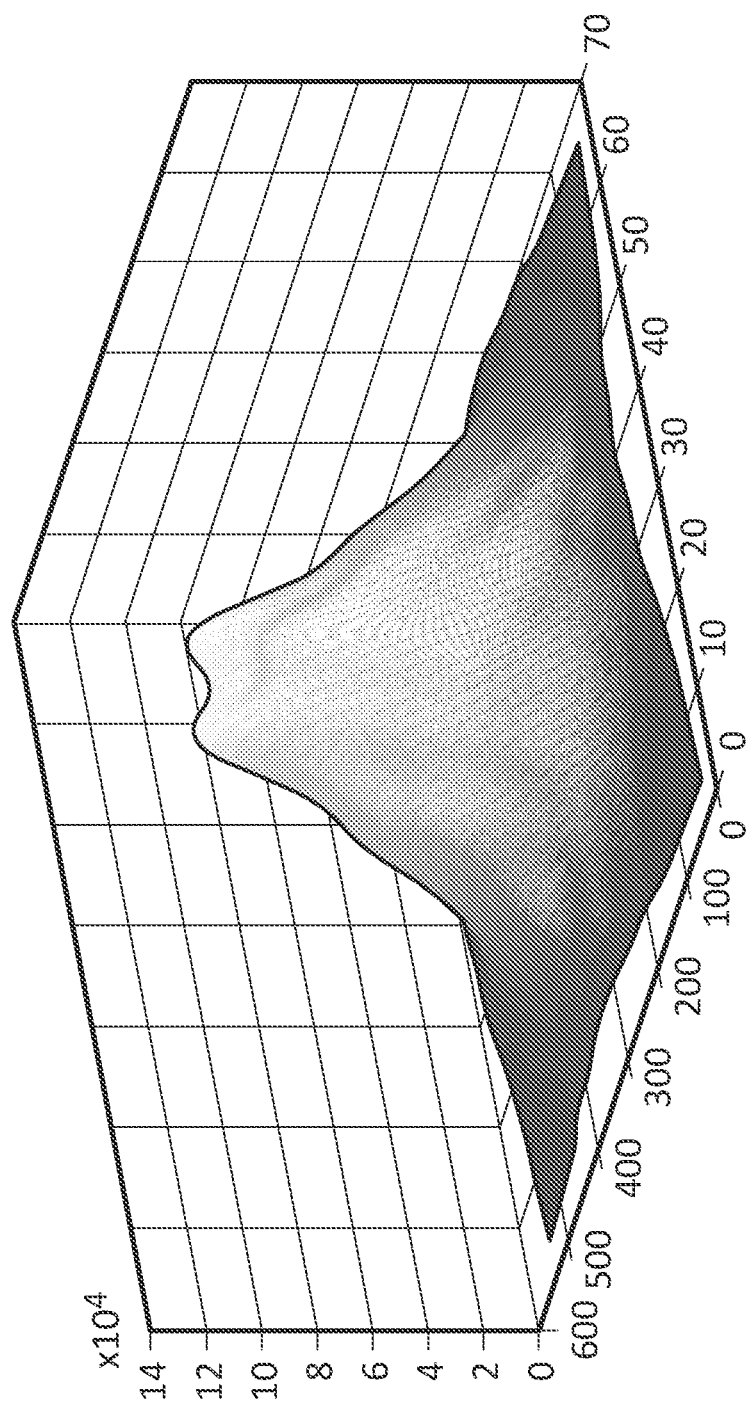
FIG. 5 illustrates an example noise power spectral density.

At block 415, a dimensionality reduction transformation is performed on the stabilized data. Such dimensionality reduction may be performed to facilitate denoising (e.g., make denoising more efficient and effective). Beamformed data may generally be highly redundant and contaminated by noise that is strongly correlated across the channels. In an aspect, data-driven dimensionality reduction may be performed via a singular value decomposition (SVD) of an inter-channel covariance matrix of the stabilized data. Other dimensionality reduction techniques, such as CUR decomposition, may be performed to implement dimensional reduction. The dimensionality reduction may be performed according to a number of components 450 to retain for filtering. In one implementation, a subset of the channel components (e.g., the most significant channel components) may be retained for processing (e.g., filtering). The number of channel components 450 to retain for processing may be selected (e.g., by a user) based on application (e.g., denoising performance), computational costs (e.g., time, complexity), user preferences, and/or other considerations. In some aspects, a number of channels to retain for processing may be determined through use of statistical methods. For instance, the number of channels may be determined by performing tests based on a magnitude of singular values against various laws and distributions (e.g., Marchenko-Pastur law and Tracy-Widom distribution) and/or general cross-validation. In some cases, the channels that are retained may be referred to as informative channels, while the other channels may be referred to/treated as uninformative/noise. For example, of the 181 channels, the 6 most significant channel components may be retained for filtering while the remaining 175 channel components are discarded as marginally significant and dominated by noise. In this example, the real-valued 512×64×181 array becomes a real-valued 512×64×6 array. Since the noise in the 181 channels is highly correlated, even though the six singular vectors are orthonormal and the stabilized noise variance is unitary (e.g., unit variance, variance of one), the variance of the six retained channels is not unitary. Furthermore, within each of the six retained channels, the noise is correlated with respect to range and Doppler. In an aspect, a power spectral density (PSD) of each channel may be obtained by adaptively scaling a noise PSD model 455 (e.g., precalibrated noise PSD model), shown in FIG. 5.

At block 420, a multichannel denoising filter is applied to the output of block 415. In an aspect, techniques for BM3D may be used to implement the multichannel denoising filter. For instance, the multichannel denoising filter may be a modified version of BM3D for correlated data. The filter may perform block matching on a first channel (e.g., the channel having a largest SNR), and use the same non-local structures across all channels, which are filtered independently one from the other. In one example, the filter may use a discrete cosine transform (DCT) (e.g., an 8×8 DCT). Knowledge of the noise variance of the DCT coefficient (e.g., PSD in DCT domain) to separate noise from signal.

Figure 6:
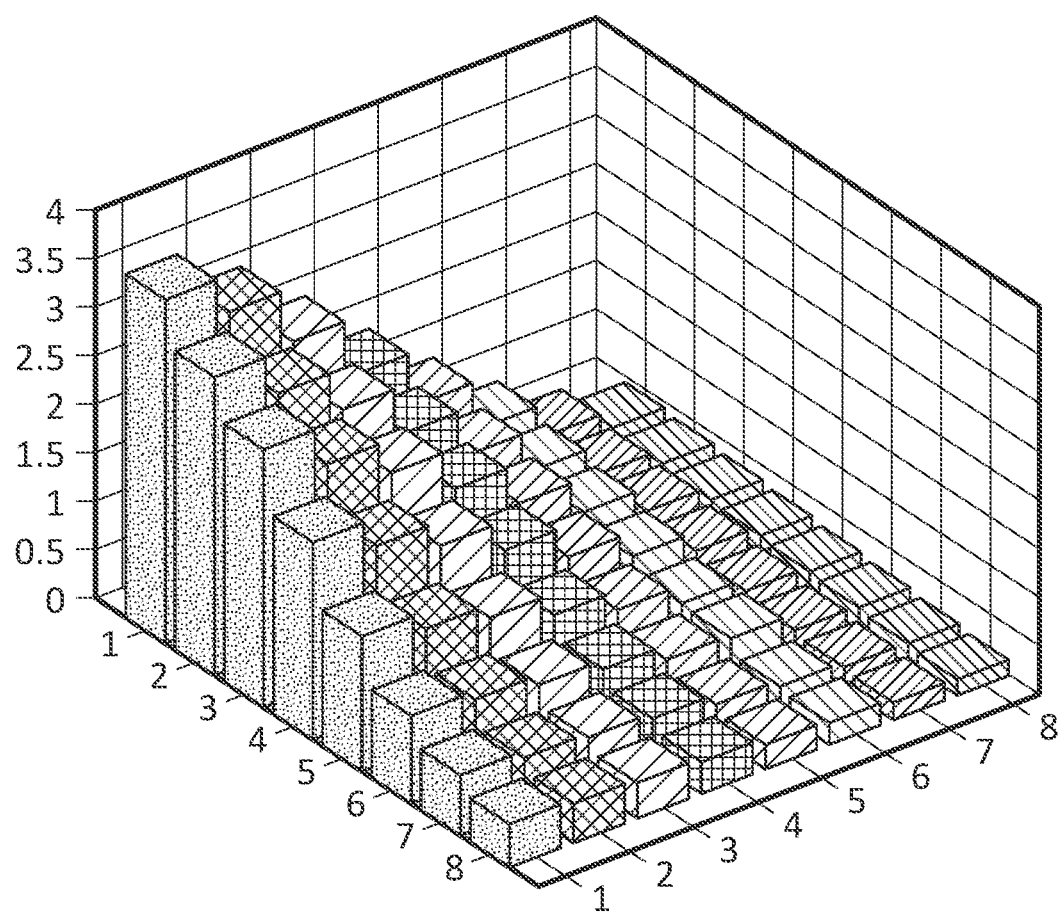
FIG. 6 illustrates an example power spectral density in the discrete cosine transform domain of noise.

This PSD in the DCT domain may be computed from the PSD of each channel (e.g., the Fourier domain PSD of each channel). FIG. 6 shows a PSD in the DCT domain of the noise affecting an 8×8 block.

In one non-limiting example, the denoising filter (e.g., BM3D-based denoising filter) may be applied as follows. The multichannel data may be organized as a three-dimensional array in which the different channels are stacked along the third dimension. The array dimension may be provided by N×M×$L_r$ (e.g., 512×64×6 in the above example), where $L_r$ is the number of reduced channels. In certain aspects, the first channel may be the channel that contains most of the signal energy and has highest SNR. In such aspects, block matching may be performed on only the first channel and position of matched blocks may be used for matching blocks in the other channels. Each channel may be denoised individually (e.g., using BM3D techniques or BM3D-based techniques), where the same matching locations (e.g., block coordinates) found for the first channel may be used for each block. This may be effective, since in some channels the SNR not be sufficient to perform reliable block matching.

After denoising, at block 425, an inverse dimensionality reduction transformation (e.g., inverse transformation of the dimensionality reduction performed at block 415) is performed on the output of block 420. In the above-example, the inverse transformation reconstitutes a 512×64×181 filtered array (e.g., a low-ranked 512×64×181 filtered array). At block 430, an inverse variance-stabilizing transformation (e.g., inverse transformation of the variance-stabilizing transformation performed at block 410) is performed on an output of block 425 to provide a denoised sequence 460. The denoised sequence 460 includes denoised beamformed amplitude radar data.

Figure 7A:
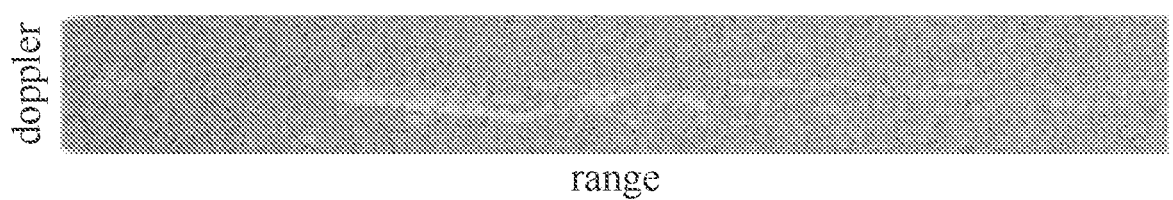
FIG. 7A illustrates a logarithm of an absolute value of a noisy image.
Figure 7B:
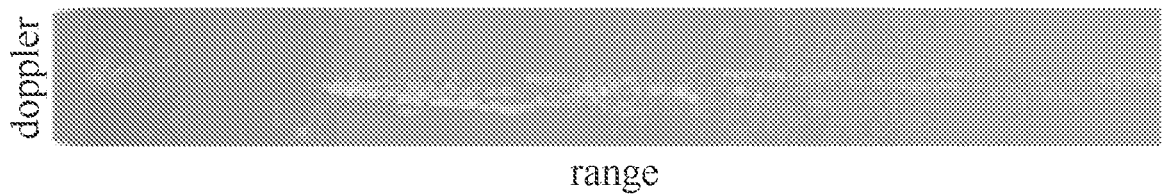
FIG. 7B illustrates a logarithm of a denoised image obtained by denoising the noisy image associated with FIG. 7A in accordance with one or more embodiments of the present disclosure.
Figure 8A:
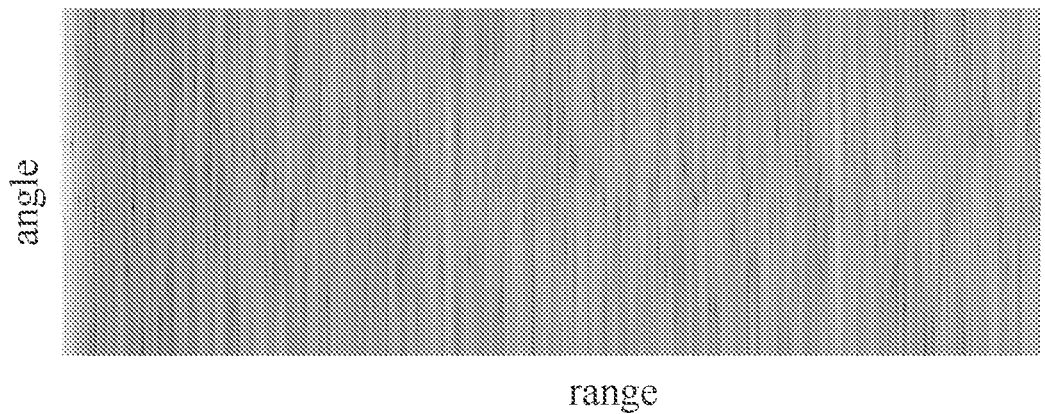
FIG. 8A illustrates a logarithm of an absolute value of a noisy image.
Figure 8B:
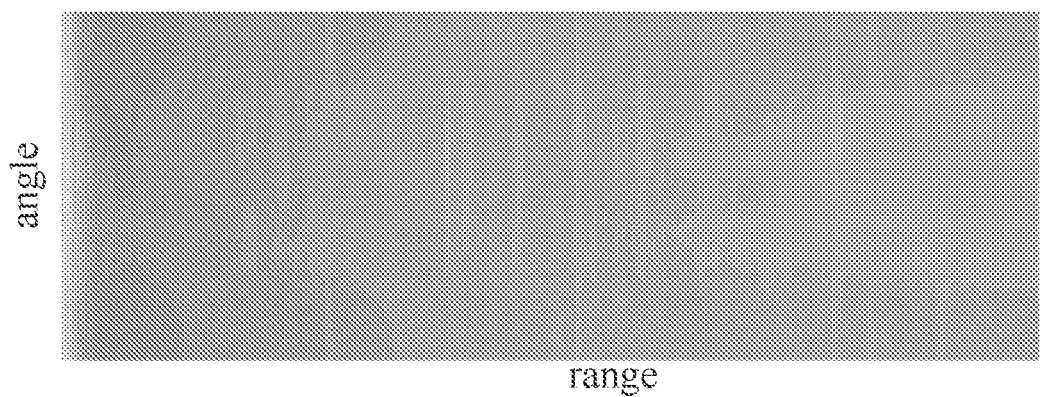
FIG. 8B illustrates a logarithm of a denoised image obtained by denoising the noisy image associated with FIG. 8A.

FIGS. 7A and 7B illustrate an effect of denoising on one frame, visualizing the Doppler and range components for one of the 181 angles. In particular, FIG. 7A illustrates a log of an absolute value of a noisy image, and FIG. 7B illustrates a log of a denoised image obtained by denoising the noisy image associated with FIG. 7A. FIGS. 8A and 8B illustrates a corresponding result with respect to the 181 angles for one of the 64 Doppler components. In particular, FIG. 8A illustrates a log of an absolute value of a noisy image, and FIG. 8B illustrates a log of a denoised image obtained by denoising the noisy image associated with FIG. 8A. FIGS. 7B and 8B both illustrate that the noise is substantially removed, while preserving minor features, diffused as well as localized.

The foregoing techniques utilized precalibrated parameters and characteristics of the noise model. In some embodiments, deployed systems may self-calibrate these parameters and characteristics periodically at boot and/or as inline processing. In an aspect, such self-calibration may be similar to those performed in a VBM4D approach. Such parameters and characteristics may be calibrated on noisy calibration data. In some cases, recalibration may be based on denoised data.

In one or more embodiments, the filtering pipeline for processing the data frame-by-frame may be enhanced by leveraging temporal structures in the data. In some cases, a strong decorrelation can be obtained with respect to tangent diagonals in the Doppler-range-time volume, which corresponds to an object moving at constant speed with respect to an observer. In one example, shearlet atoms may be utilized. In another example, penalty terms may be used in block-matching to favor trajectories along those diagonals. In an aspect, the filtering pipeline may be tuned towards optimization of a tracker's output. A dependence of a position of a local angular maxima on a number of significant components retained after dimensionality reduction (e.g., SVD-based dimensionality reduction) may be determined to facilitate such tuning.

Although the foregoing describes estimating an expectation of noisy Rician data, in other embodiments an estimate may be performed of the amplitude of the unknown complex-valued noise-free data. Such an estimate may result in a background level which is approximately uniform and zero across an entire frame, which may provide increased contrast. In such a case, an appropriate inverse VST (e.g., relative to an inverse Rician-based VST) may be performed. In some aspects, a phase of the radar data may be used to enable improved angular accuracy.

Figure 9:
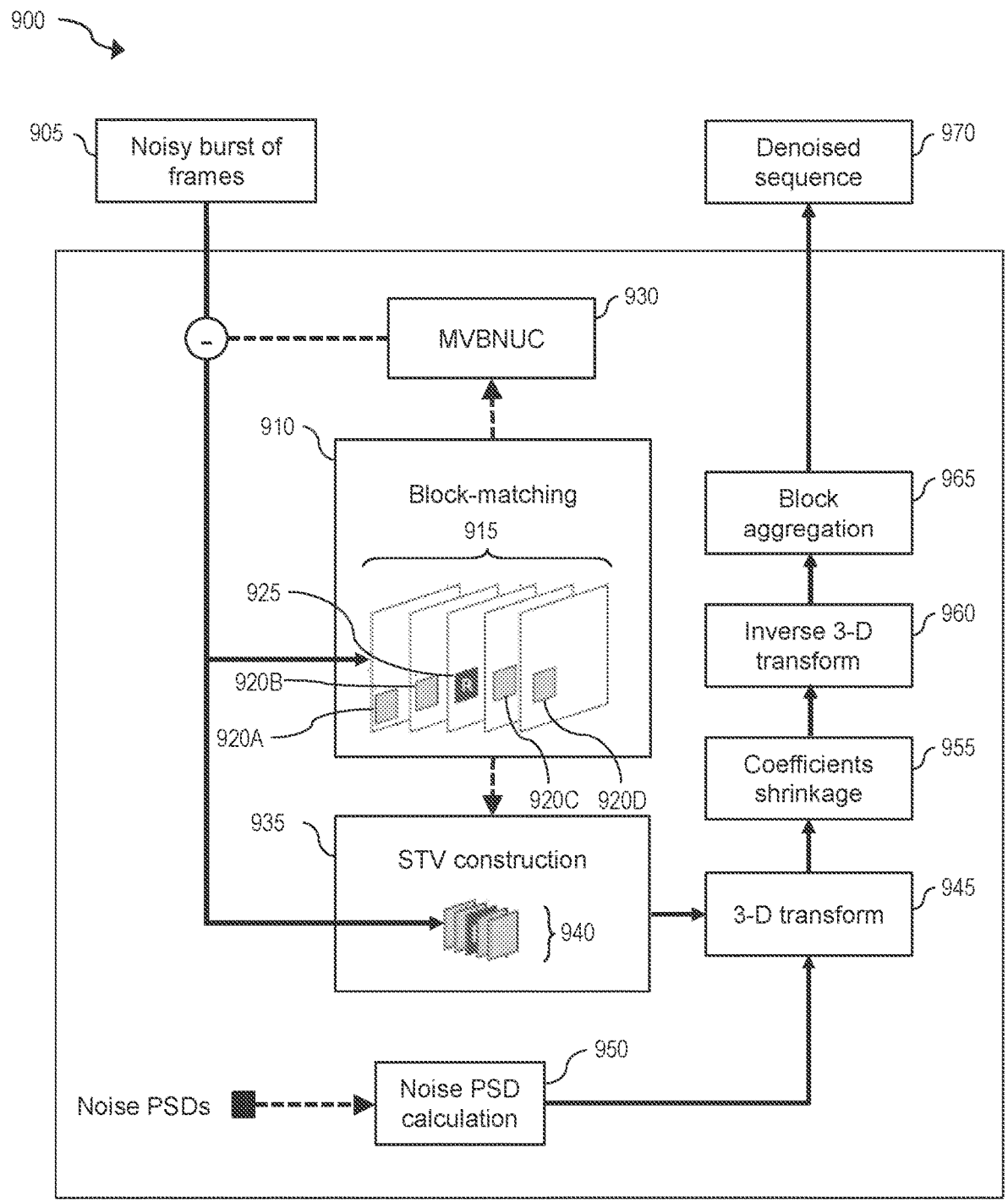
FIG. 9 illustrates an example process to facilitate denoising of radar data in accordance with one or more embodiments of the present disclosure.

FIG. 9 illustrates an example process 900 to facilitate denoising of radar data in accordance with one or more embodiments of the present disclosure. In an embodiment, the processors 130 of FIG. 1 may be utilized to perform the example process of FIG. 9. It should be appreciated that the processors 130 and various components thereof are identified only for purposes of example, and that any other suitable system may be utilized to perform all or part of the process 900. Note that one or more operations may be combined, omitted, and/or performed in a different order as desired. In some embodiments, the process 900 may be, or may be referred to as, a denoising pipeline to generate denoised radar data. Output data from operation may be processed by the denoising pipeline to mitigate (e.g., remove, reduce, eliminate) noise. In some aspects, the denoising pipeline may utilize a BM3D denoising framework. As further described below, the denoising pipeline may operate in a sliding temporal window manner, where, for a given image, past and future images may be used in a collaborative filtering approach. In this regard, the denoising pipeline may utilize a spatiotemporal filter.

At block 905, data frames may be received. The data may be referred to as a noisy burst of data frames. In an aspect, the frames include noisy radar data. In an aspect, the data frames may be an output of block 415 of FIG. 4. At block 910, block-matching may be performed to facilitate subsequent construction of spatiotemporal volumes. Block-matching may be utilized to track blocks along overlapping sections of past and future frames, and the positions of the best matches may be stored in a table (e.g., referred to as a match table). With each new frame arrival, a set of reference blocks may be selected from a reference image. A reference block may be a block used as reference in block-matching to create a spatiotemporal volume. For each reference block, similar blocks (e.g., meeting a certain similarity criterion) may be found in past and future frames. For example, frames 915 may be examined to search for image blocks 920A-920D matching (e.g., meeting a certain similarity criterion) a reference image block 925. In this example, it is noted that the image blocks 920A and 920B may be from past frames and image blocks 920C and 920D may be from future frames. It is noted that frames may be referred to as future frames or past frames based on their temporal position along a motion trajectory relative to a temporal position associated with a reference frame. In some cases, denoising complexity may be based on an adjustable parameter indicative of a distance (e.g., in pixels) taken between consecutive reference blocks. A smaller distance may be associated with finer denoising but higher complexity (e.g., higher number of operations). At block 930, a motion vector base non-uniformity correction (MVBNUC) may be performed to estimate non-uniformity (e.g., spatial noise).

As such, a sliding temporal window manner may be utilized, in which, for a given image, past and future images may be utilized. Images contained within the temporal window may be stored in a buffer (e.g., referred to as a block buffer), where possible blocks (e.g., all possible blocks) belonging to the frames may be transformed. For example, the blocks may be transformed by applying two separable one-dimensional transforms and stored in a vectorized form. Block trajectory computations by means of block-matching may be utilized in order to track blocks along the temporal window. Positions in the block buffer of matches (e.g., best matches) may be stored in a table (e.g., referred to as a match table). In some cases, longer temporal windows may be associated with higher denoising quality but a higher number of operations. In an embodiment, an overlap between consecutive captured frames may determine a useful length of the temporal window. For example, the temporal window may be provided as an array with a number of past and future frames (e.g., [$N_{past}$, $N_{future}$]). A multi-scale block-matching approach may be used here, such as in a coarse-to-fine manner, block-matching may first be applied on a down-scaled version of the frames and the results are used as a prediction in the next finer scale.

Results of the block-matching at operation 910 may be provided to a collaborative filtering stage. The collaborative filtering stage may be implemented at blocks 935, 945, 955, 960, and 965. At block 935, spatiotemporal volumes may be constructed based on the results of the block-matching. The data 915 may be examined to search for image blocks 920A-920D matching (e.g., meeting a certain similarity criterion) a reference image block 925. The reference image block 925 and the image blocks 920A-920D may define a motion trajectory, and may be stacked together to construct a spatiotemporal volume 940. In an aspect, single spatiotemporal volumes may be created by retrieving/extracting and stacking blocks (e.g., indexes found in the match table), with each volume being formed by a respective set of stacked blocks. In this regard, the entries (e.g., values) stored in the match table may be used to create single spatiotemporal groups by retrieving the corresponding blocks from the block buffer. For example, in one implementation, each column in the match table may contain the indices in the block buffer needed to retrieve the blocks that form the spatiotemporal volume. The extracted blocks (e.g., on which the 2-D transform has already been applied in some cases) are stacked to form a spatiotemporal volume of temporal length $N \in [1, N_t]$, and are decorrelated in temporal direction by applying a one-dimensional transform of length N along the third dimension of the volume. In addition, in some cases, original spatiotemporal coordinates of the blocks may be used to create the trajectory of the spatiotemporal volume, which may later be used in spatiotemporal interpolation. If the selected transform for temporal decorrelation requires it (e.g., Haar transform), the length of the group may be to restricted to have a length of power of 2 (e.g., $N=2^k$ where k may be an arbitrary positive integer).

At block 945, a 3-D transform may be applied to the spatiotemporal volumes to obtain 3-D spectra. The 3-D transform may be based on a PSD. In some aspects, calculation of new PSDs may need to be done only once as a calibration step. For example, at block 950, the new PSDs may be determined. In this regard, the PSDs do not need to be estimated during operations on radar data, but rather may be treated as built-in calibration parameters in some embodiments.

At block 945, a decorrelating 3-D transform may be applied to the spatiotemporal volumes. Such a decorrelating 3-D transform may include a discrete cosine transform (DCT), discrete sine transform (DST), discrete wavelet transform (DWT), discrete Fourier transform (DFT), or any other appropriate transform (e.g., separable, orthogonal transforms) that typically decorrelate image signals. In one embodiment, a DCT may be utilized for the transform operation.

A decorrelating 3-D transform may be applied by a separable cascaded composition of lower dimensional transforms. For example, for spatial decorrelation, a 2-D transform (e.g., a separable DCT of size 8×8) may be applied to each of the image blocks (e.g., having a size of 8×8) stacked in the spatiotemporal volume, and for the temporal decorrelation, a 1-D transform of length N (e.g., a 1-D DCT of length matching the length of the spatiotemporal volume) may be applied. As may be appreciated by one skilled in the art, the order of these two cascaded transforms may be reversed, leading to an identical result.

At block 955, a shrinkage of the 3-D spectra of the spatiotemporal volumes may be performed. In some aspects, thresholds associated with the shrinkage may depend on a noise standard deviation and PSD matrix. For example, the 3-D spectra may be shrunk by hard-thresholding to modify spectra coefficients (e.g., modify an amplitude of the spectra coefficients) based on the standard deviation of the noise in each coefficient. The thresholds may be determined using the PSD matrix and its corresponding scaling factor (e.g., the scaling factor scales the PSD). The scaling factor may be a standard deviation of noise after the deblurring stage. The number of retained non-zero coefficients may be used to determine the weight of the spatiotemporal volume for convex combination. In some cases, a level of shrinkage of the 3-D spectra may be an adjustable parameter. For example, higher values for the parameter may result in stronger denoising and smoothing. In some denoising implementations, during a hard-thresholding stage, variances of the transformed spatiotemporal group may be determined adaptively depending on the relative spatial position of the blocks forming the group and the PSDs. In some cases, the MVBNUC performed at block 930 handles estimating the non-uniformity (e.g., spatial noise).

Shrinking may include thresholding (e.g., hard thresholding, soft thresholding, or others), scaling, Wiener filtering, or other operations suitable for regularizing signals in a transform domain. In various embodiments, shrinking modifies the spectral coefficients based on corresponding coefficient standard deviations of noise that may be embedded in each spectral coefficient. Thus, for example, in one embodiment, shrinking may be performed by hard thresholding the spectral coefficients based on the corresponding coefficient standard deviations (e.g., setting a value to 0 if it does not meet a threshold value). In another example, shrinking may be performed in two or more stages, in which thresholding may be performed in earlier stages to provide an estimate to Wiener filtering performed in later stages.

Other operations may also be performed on the shrunk 3-D spectra for further processing or manipulation. For example, in one embodiment, the spectral coefficients may be further modified using collaborative a-rooting or other techniques that sharpen and/or enhance the contrast in images by boosting appropriate ones of the spectral coefficients. In other examples, image restoration, deblurring, sharpening, equalization, super-resolution, or other operations may be performed to further modify the coefficients of the shrunk 3-D spectra. Whereas inaccurately modeled and/or sub-optimally suppressed noise often render enhancement and other operations ineffective, or worse, cause enhancement and other operations to degrade rather than improve images, near-optimal suppression of noise that may be achieved by embodiments of the disclosure may beneficially improve the efficacy of enhancement and other operations, as further illustrated herein.

At block 960, an inverse 3-D transform may be applied to the shrunk 3-D spectra to obtain filtered spatiotemporal volumes. The inverse of the decorrelating 3-D transform may be applied to the shrunk 3-D spectra to obtain filtered spatiotemporal volumes. Cascaded separable inverse 2-D and 1-D transforms may be applied in any order to obtain filtered spatiotemporal volume. At block 965, blocks from the filtered spatiotemporal volumes may be aggregated using appropriate aggregation techniques to generate filtered frames (e.g., a denoised sequence 970 of frames). The denoised sequence 970 may be, or may include, the denoised sequence 460 of FIG. 4. For example, in various embodiments, aggregation may include weighted averaging of image blocks. In some embodiments, weights for averaging may be based in part on the coefficient standard deviation.

In some embodiments, by way of non-limiting examples, detection processing may be performed on the denoised sequence 970 to generate detection data may include performing Constant False Alarm Rate (CFAR) schemes, Clutter-Map schemes, thresholding schemes, and/or centroid processing. CFAR schemes may be performed to facilitate adaptively determining detection thresholds based on radar returns from several neighboring range cells. CMAP schemes may be performed to facilitate filtering out clutter (e.g., static clutter). For example, clutter may be a radar return from an object or objects that are of no interest to the radar application, such as trees in some cases. In an aspect, an object of interest may be referred to as a target. Whether an object is of interest is generally dependent on application. Thresholding schemes may be performed to facilitate determining if an instantaneous radar return in one range cell exceeds a threshold and should be considered a detection of a target. In some instances, a presence and/or movement of a target in a measurable way (e.g., above a threshold probability of a target being present and/or above a threshold amount of movement) by a radar system may be referred to as a detection of the target. Centroid processing may be performed to determine a precise location of grouped-detections based on center-of-intensity.

Detection data may include detections associated with one or more targets (e.g., and/or data to derive such detections); centroid position information in range, Doppler, and/or azimuth; signal intensity for radar return signals; SNR for detected signals to provide information about noise/clutter surrounding a target; information about the size of a detection in range (e.g., depth); Doppler (e.g., Doppler spread), and azimuth (e.g., target width); and/or a timestamp (e.g., a time at which detection information is obtained). The detection data may allow, for instance, determination of velocity (e.g., relative to the radar system that transmitted the pulses/ramps and received the radar return data), and, consequently, facilitate detection of targets at least on the basis of such determined velocity. In some embodiments, denoised data are processed immediately upon availability to generate detection data. For example, the detection data may be sent to a tracker for processing immediately upon availability. The tracker may process the detection data immediately upon availability to provide an updated output of radar tracks. When the tracker receives additional detection data, the tracker may update and/or filter the radar tracks as appropriate based on the additional detection data. The radar tracks not associated with the additional detection data may be are coasted/extrapolated until the next update.

The tracker generates target data. Target data may include information associated with one or more targets or potential targets detected by the radar system. Such information may include, for example, a location of a target and a velocity (e.g., speed and direction) of a target. Non-limiting examples of target generation are provided as follows. Generating target data may be performed by target tracking algorithms such as associating new contacts with existing tracks. In an aspect, tracks of a target refer to radar observations (e.g., consecutive radar observations) of the target. Generating target data may be performed by updating/filtering new track positions using information such as centroid position information from newly associated contact(s). Generating target data may be performed by extrapolating/coasting positions of tracks that do not receive new detection data in the current scan/iteration (e.g., no association). Generating target data may be performed by initiating new tracks with un-associated contacts. Generating target data may be performed by terminating tracks with no recent associations. In an aspect, the tracker generates scene information of a scene. The scene information may include target data (e.g., information associated with objects of interest) and other information (e.g., information associated with objects not of interest and/or generally other information associated with the scene).

In some embodiments, the target data that is generated may be utilized to determine whether and/or what type of actions to perform. If the target data indicates that no targets are present, the radar system continues to monitor for targets without performing any mitigation actions. If the target data indicates that a target(s) is present, the radar system (e.g., human operator, autonomous system) may determine whether and/or what type of mitigation actions to perform. For example, if the radar system is utilized as part of a search-and-rescue application, a target may be a person needing to be rescued and a mitigation action in response to identifying the target (e.g., determining position and/or velocity of the target) may be to transmit signals to appropriate first responders to provide aid to the target. As another example, if the radar system is utilized as part of a navigation application of a manned or unmanned vehicle, a target may be an obstacle (e.g., moving or otherwise) to be avoided during navigation and a mitigation action in response to identifying the target (e.g., determining position and/or velocity of the target) may be to maneuver (e.g., autonomously or with human action) the vehicle to avoid the target.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
receiving radar data;
beamforming the radar data to obtain beamformed radar data associated with a first plurality of channels;
performing a first transform associated with the beamformed radar data to obtain transformed radar data, wherein the transformed radar data is associated with a location parameter and a variance that is independent of the location parameter;
performing a second transform of the transformed radar data to obtain dimensionality-reduced radar data associated with a second plurality of channels, wherein the number of channels in the second plurality of channels is less than the number of channels in the first plurality of channels, and wherein each channel of the first and second plurality of channels is associated with a respective angle; and
filtering, by a multichannel denoising filter, the dimensionality-reduced radar data to obtain denoised dimensionality-reduced radar data.

2. The method of claim 1, further comprising:
performing a third transform of the denoised dimensionality-reduced radar data to obtain denoised transformed radar data, wherein the third transform comprises an inverse transform of the second transform; and
performing a fourth transform of the denoised transformed radar data to obtain denoised radar data, wherein the fourth transform comprises an inverse transform of the first transform.

3. The method of claim 1, further comprising determining a magnitude of the beamformed radar data to obtain magnitude images, wherein the first transform is associated with the magnitude images.

4. The method of claim 3, wherein the magnitude images have a Rician distribution, and wherein the first transform comprises a variance-stabilizing transformation for the Rician distribution.

5. The method of claim 1, wherein the first transform comprises a variance-stabilizing transformation.

6. The method of claim 5, wherein the radar data has a variance that depends on a location parameter of the radar data.

7. The method of claim 1, wherein the transformed radar data has unit variance.

8. The method of claim 1, wherein the second transform comprises a singular value decomposition.

9. The method of claim 1, further comprising determining a respective power spectral density of each channel of the second plurality of channels, wherein the filtering is based on the power spectral density of each channel.

10. The method of claim 1, wherein the filtering comprises:
performing block matching on a first channel of the second plurality of channels to obtain a set of block coordinates; and
denoising each of the second plurality of channels based on the set of block coordinates.

11. The method of claim 1, wherein the beamformed radar data is associated with a scale parameter indicative of a tensor product of a range-wise standard deviation and a channel-wise standard deviation.

12. The method of claim 1, wherein the first transform is based on a range-wise standard deviation and a channel-wise standard deviation.

13. A system comprising:
a receiver configured to receive radar data;
a processor coupled to the receiver; and
a non-transitory machine-readable medium comprising instructions stored therein, which when executed by the processor, cause the processor to perform operations comprising:
beamforming the radar data to obtain beamformed radar data associated with a first plurality of channels;
performing a first transform associated with the beamformed radar data to obtain transformed radar data, wherein the transformed radar data is associated with a location parameter and a variance that is independent of the location parameter;
performing a second transform of the transformed radar data to obtain dimensionality-reduced radar data associated with a second plurality of channels, wherein the number of channels in the second plurality of channels is less than the number of channels in the first plurality of channels, and wherein each channel of the first and second plurality of channels is associated with a respective angle;
determining a respective power spectral density of each channel of the second plurality of channels; and
filtering the dimensionality-reduced radar data based on the power spectral density of each channel to obtain denoised dimensionality-reduced radar data.

14. The system of claim 13, wherein the operations further comprise:
performing a third transform of the denoised dimensionality-reduced radar data to obtain denoised transformed radar data, wherein the third transform comprises an inverse transform of the second transform; and
performing a fourth transform of the denoised transformed radar data to obtain denoised radar data, wherein the fourth transform comprises an inverse transform of the first transform.

15. The system of claim 13, wherein the operations further comprise determining a magnitude of the beamformed radar data to obtain magnitude images, and wherein the first transform is associated with the magnitude images.

16. The system of claim 15, wherein the magnitude images have a Rician distribution, and wherein the first transform comprises a variance-stabilizing transformation for the Rician distribution.

17. The system of claim 13, wherein the first transform comprises a variance-stabilizing transformation.

18. The system of claim 17, wherein the radar data has a variance that depends on a location parameter of the radar data.

19. The system of claim 13, wherein the transformed radar data has unit variance.

20. The system of claim 13, wherein the second transform comprises a singular value decomposition.

\* \* \* \* \*

UNITED STATES PATENT AND TRADEMARK OFFICE
CERTIFICATE OF CORRECTION

| | |
|---|---|
| PATENT NO. | : 12,228,677 B2 |
| APPLICATION NO. | : 17/777000 |
| DATED | : February 18, 2025 |
| INVENTOR(S) | : Alessandro Foi and Lucio Azzari |

It is certified that error appears in the above-identified patent and that said Letters Patent is hereby corrected as shown below:

In the Specification

In the DETAILED DESCRIPTION:

Column 3, Lines 38-39, change "compact portable unit to that may be" to --compact portable unit that may be--.

Column 5, Lines 3-4, change "so as to to perform method and process" to --so as to perform method and process--.

Column 11, Lines 54-55, change "the group may be to restricted to have" to --the group may be restricted to have--.

Signed and Sealed this
Fifteenth Day of April, 2025

Coke Morgan Stewart
*Acting Director of the United States Patent and Trademark Office*